(12) United States Patent
Mizuno et al.

(10) Patent No.: US 8,741,492 B2
(45) Date of Patent: Jun. 3, 2014

(54) LITHIUM AIR BATTERY

(75) Inventors: Fuminori Mizuno, Toyota (JP); Shinji Nakanishi, Toyota (JP); Yoshiharu Takasaya, Toyota (JP)

(73) Assignee: Toyota Jidosha Kabushiki Kaisha, Toyoto-Shi (JP)

( * ) Notice: Subject to any disclaimer, the term of this patent is extended or adjusted under 35 U.S.C. 154(b) by 275 days.

(21) Appl. No.: 12/999,460

(22) PCT Filed: Dec. 25, 2008

(86) PCT No.: PCT/JP2008/073569
§ 371 (c)(1),
(2), (4) Date: Dec. 16, 2010

(87) PCT Pub. No.: WO2010/073332
PCT Pub. Date: Jul. 1, 2010

(65) Prior Publication Data
US 2011/0091777 A1 Apr. 21, 2011

(51) Int. Cl.
*H01M 8/22* (2006.01)
(52) U.S. Cl.
USPC .......................................... 429/405; 429/403
(58) Field of Classification Search
USPC ........................................................ 429/403
See application file for complete search history.

(56) References Cited

U.S. PATENT DOCUMENTS 7,147,967 B1 * 12/2006 Read ............................. 429/217

FOREIGN PATENT DOCUMENTS

| JP | 06-260685 A | 9/1994 |
| JP | 11-014769 A | 1/1999 |
| JP | 2006-286414 A | 10/2006 |
| JP | 2008-103473 A | 5/2008 |
| JP | 2008-112661 A | 5/2008 |

OTHER PUBLICATIONS

English translation of JP 2006-286414A to Kuboki.*
Derwent abstract of US Patent Application Publication 2007/0051620 to Visco et al.*

* cited by examiner

*Primary Examiner* — Patrick Ryan
*Assistant Examiner* — Lucas J O Donnell
(74) *Attorney, Agent, or Firm* — Kenyon & Kenyon LLP

(57) ABSTRACT

A main object of the present invention is to provide a lithium air battery which can use different battery properties according to the current density at the time of discharge. The present invention attains the object by providing a lithium air battery comprising a cathode layer, an anode layer, and an electrolyte layer formed between the cathode layer and the anode layer, characterized in that the cathode layer further comprises a first cathode layer having at least oxygen reduction ability and a second cathode layer having at least Li ion storage ability, and the second cathode layer contains a cathode active material having an average voltage of less than 2.0 V (vs. Li) or an average voltage of more than 2.9 V (vs. Li).

3 Claims, 2 Drawing Sheets

LITHIUM AIR BATTERY

This is a 371 national phase application of PCT/JP2008/073569 filed 25 Dec. 2008, the contents of which are incorporated herein by reference.

TECHNICAL FIELD

The present invention relates to a lithium air battery which can use different battery properties according to the current density at the time of discharge. More specifically, the present invention relates to a lithium air battery which functions as a high-capacity lithium air battery at the time of low-current discharge while functions as a high-power lithium ion battery at the time of large-current discharge.

BACKGROUND ART

The lithium air battery is a battery using air (oxygen) as the cathode active material and has advantages such as being high in energy density and being easy to downsize and weight save. Thus, the lithium air battery is attracting attention as a high-capacity secondary battery which exceeds the lithium ion battery widely used at present.

Heretofore, there have been attempts of incorporating the function(s) of lithium ion battery to the lithium air battery in order to obtain a highly-functional lithium air battery. For example, the Patent Document 1 discloses a nonaqueous electrolyte air battery comprising a layer having at least oxygen reduction ability and a layer having at least lithium ion storage ability, in which the layer having the lithium ion storage ability contains an active material which has ability to store lithium ions of 2.0 V or more to 2.9 V or less (vs. Li).

This technique aims to improve the large-current discharge properties of the battery by providing a layer which functions as a cathode layer of the lithium ion battery (a layer which at least has lithium ion storage ability) in addition to a layer which functions as a cathode of the lithium air battery (a layer which at least has oxygen reduction ability). Thereby, even when the amount of air supplied to the lithium air battery is reduced in order to restrain water from entering the battery, the lithium ion battery functions complementary so that the large-current discharge properties of the battery is improved.
Patent Document 1: Japanese Patent Application Laid-Open (JP-A) No. 2006-286414

DISCLOSURE OF THE INVENTION

Problems to be Solved by the Invention

On the other hand, from the view point of obtaining a highly-functional lithium air battery, a lithium air battery which can use different battery properties according to the current density at the time of discharge has been desired. More specifically, a lithium air battery which functions as a high-capacity lithium air battery at the time of low-current discharge while functions as a high-power lithium ion battery at the time of large-current discharge has been desired. However, the reality is such that no finding regarding such lithium air battery has been found so far.

The Patent Document 1 discloses a lithium air battery which has the above-mentioned technical structure where the battery comprises a layer which functions as a cathode layer of the lithium ion battery in addition to a layer which functions as a cathode layer of the lithium air battery. However, this battery has the operating voltage ranges for the lithium air battery and the lithium ion battery overlap in 2.0 V to 2.9 V (vs. Li). Therefore, the lithium air battery of the Patent Document 1 does not use different battery properties according to the current density at the time of discharge.

The present invention is attained in view of the above situation and a main object thereof is to provide a lithium air battery which can use different battery properties according to the current density at the time of discharge.

Means for Solving the Problem

To solve the above-mentioned problem, the present invention provides a lithium air battery comprising a cathode layer, an anode layer, and an electrolyte layer formed between the cathode layer and the anode layer, characterized in that the cathode layer further comprises a first cathode layer having at least oxygen reduction ability and a second cathode layer having at least Li ion storage ability, and the second cathode layer contains a cathode active material having an average voltage of less than 2.0 V (vs. Li) or an average voltage of more than 2.9 V (vs. Li).

In the present invention, by using the above-mentioned cathode active material, it becomes possible to separate the operating voltage range as a lithium air battery and the operating voltage range as a lithium ion battery. Thereby, a lithium air battery which can use different battery properties according to the current density at the time of discharge is obtained.

In the above invention, the cathode active material is preferably graphite or $Li_4Ti_5O_{12}$. This is because these cathode active materials have an average voltage of less than 2.0 V (vs. Li) and can clearly separate their operating voltage ranges.

In the above invention, the cathode active material is preferably $LiCoO_2$ or $LiFePO_4$. This is because these cathode active materials have an average voltage of more than 2.9 V (vs. Li) and can clearly separate their operating voltage ranges.

In the above invention, the first cathode layer and the second cathode layer are preferably laminated and provided in order of the second cathode layer and the first cathode layer from the anode layer side. Thereby, intake of oxygen becomes easy.

Effect of the Invention

The present invention attains an effect of providing a lithium air battery which can use different battery properties according to the current density at the time of discharge. More specifically, the lithium air battery of the present invention can function as a high-capacity lithium air battery at the time of low-current discharge while function as a high-power lithium ion battery at the time of large-current discharge.

DESCRIPTION OF REFERENCE NUMERALS

Figure 1:
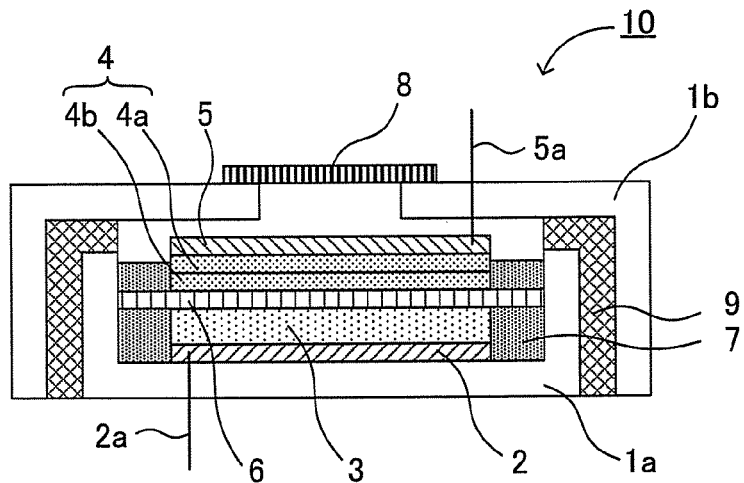
FIG. 1 is a schematic cross-sectional view illustrating one embodiment of the lithium air battery of the present invention.

1a . . . anode case
1b . . . cathode case

2 ... anode current collector
2a ... anode lead
3 ... anode layer
4 ... cathode layer
4a ... first cathode layer
4b ... second cathode layer
5 ... cathode current collector
5a ... cathode lead
6 ... separator
7 ... nonaqueous liquid electrolyte
8 ... microporous membrane
9 ... packing

BEST MODE FOR CARRYING OUT THE INVENTION

Hereinafter, a lithium air battery of the present invention will be explained in detail.

A lithium air battery of the present invention comprises a cathode layer, an anode layer, and an electrolyte layer formed between the cathode layer and the anode layer, characterized in that the cathode layer further comprises a first cathode layer having at least oxygen reduction ability and a second cathode layer having at least Li ion storage ability, and the second cathode layer contains a cathode active material having an average voltage of less than 2.0 V (vs. Li) or an average voltage of more than 2.9 V (vs. Li).

In the present invention, by using the above-mentioned cathode active material, it becomes possible to separate the operating voltage range as a lithium air battery and the operating voltage range as a lithium ion battery. Thereby, a lithium air battery which can use different battery properties according to the current density at the time of discharge is obtained. More specifically, the lithium air battery can function as a high-capacity lithium air battery at the time of low-current discharge while function as a high-power lithium ion battery at the time of large-current discharge. In other words, a dual-type battery where a function as a high-capacity type battery (lithium air battery) and a function as a high-power type battery (lithium ion battery) are combined in one battery is obtained. Further, since the lithium air battery of the present invention has two battery functions of different properties, there is no need of separately providing two batteries and it becomes possible to downsize and reduce the weight of the battery.

FIG. 1 is a schematic cross-sectional view illustrating one embodiment of the lithium air battery of the present invention. A lithium air battery 10 shown in FIG. 1 comprises: an anode case 1a; an anode current collector 2 formed on the inner bottom face of the anode case 1a; an anode lead 2a connected to the anode current collector 2; an anode layer 3 formed on the anode current collector 2 and contains an anode active material; a cathode layer 4 comprising a first cathode layer 4a which has at least oxygen reduction ability and a second cathode layer 4b which has at least Li ion storage ability; a cathode current collector 5 which corrects currents of the cathode layer 4; a cathode lead 5a connected to the cathode current collector 5; a separator 6 provided between the anode layer 3 and the cathode layer 4; a nonaqueous liquid electrolyte 7 for dipping the anode layer 3 and the cathode layer 4; a cathode case 1b having a microporous membrane 8 which supplies oxygen; and a packing 9 formed between the anode case 1a and the cathode case 1b.

In the present invention, the cathode layer 4 comprises the first cathode layer 4a and the second cathode layer 4b, and further, the second cathode layer 4b contains a cathode active material having an average voltage of less than 2.0 V (vs. Li) or an average voltage of more than 2.9 V (vs. Li). By having such cathode active material, it becomes possible to separate the operating voltage range as the lithium air battery and the operating voltage range as the lithium ion battery.

Figure 2A:
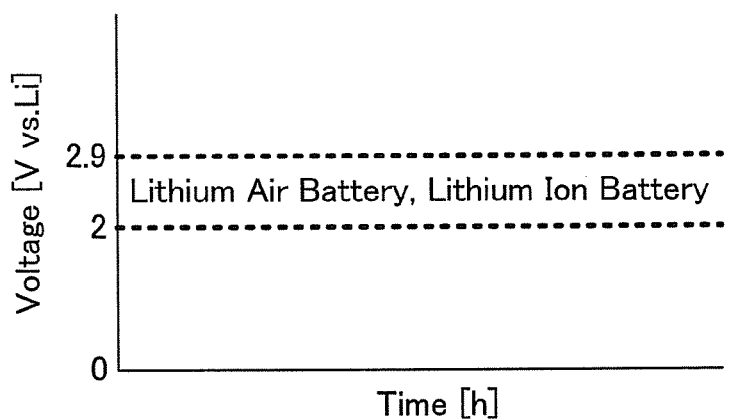
FIGS. 2A and 2B are illustrations explaining the difference between a conventional lithium air battery and a lithium air battery of the present invention.
Figure 2B:
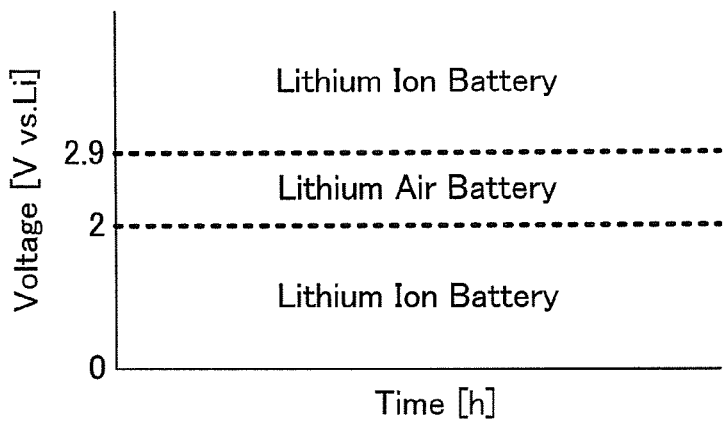

Here, FIGS. 2A and 2B are illustrations explaining the difference between a conventional lithium air battery and a lithium air battery of the present invention. The conventional lithium air battery (the lithium air battery described in the Patent Document 1) has the operating voltage range as the lithium air battery and the operating voltage range as the lithium ion battery at the time of discharge positively overlapped as shown in FIG. 2A. On the other hand, the lithium air battery of the present invention separates the operating voltage range as a lithium air battery and the operating voltage range as a lithium ion battery at the time of discharge as shown in FIG. 2B, and thereby it becomes possible to use different battery properties according to the current density at the time of discharge.

Further, the following is cited as an advantage of separating the operating voltage range. That is, in the conventional lithium air battery, since the operating voltage range as the lithium air battery and the operating voltage range as the lithium ion battery overlap, Li oxides (such as $LiO_2$ and $Li_2O_2$) which are the discharge products of the lithium air battery are generated to the cathode layer irrespective of the size in current density. As these Li oxides are insulating products unlike the SEI (Solid Electrolyte Interface) film of the lithium ion battery, there are problems that the reaction resistance of the cathode increases considerably and input-output characteristics or cycle characteristics lowers. Compare to this, the lithium air battery of the present invention can function as a lithium air battery at the time of low-current discharge and function as a lithium ion battery at the time of large-current discharge. Thereby, it becomes possible to restrain the generation of unnecessary Li oxides. As a result of this, the above-mentioned problems are solved.

Figure 3:
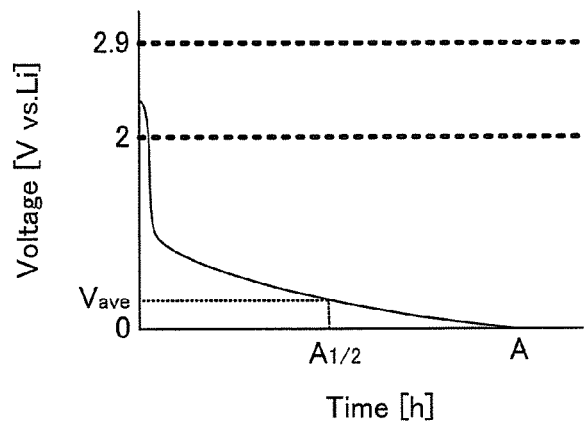
FIG. 3 is an illustration explaining the average voltage of the cathode active material.

Further, the operating voltage range of the lithium air battery at the time of discharge is within the voltage where Li oxides are generated from Li ions and oxygen, and is normally within the range of 2.0 V to 2.9 V (vs. Li). Thus, in the present invention, separation of operating voltage range is attempted by using the cathode active material which has an average voltage of less than 2.0 V (vs. Li) or an average voltage of more than 2.9 V (vs. Li). Here, a value in the average voltage of the cathode active material is decided as follows. That is, a cell for measuring which comprises a cathode layer containing a cathode active material, an anode layer made of a Li metal, and a nonaqueous liquid electrolyte (density 1M, $LiClO_4$/PC) is prepared, and a discharge at a constant current density of about 0.2 mA/cm$^2$ to 2.0 mA/cm$^2$ is carried out. Afterwards, as shown in FIG. 3, the time the voltage shifts to a cutoff voltage optionally set (for example 0 V) is made A, and a voltage where the time becomes the half of A, which is $A_{1/2}$, is made the average voltage $V_{ave}$. Here, in FIG. 3, the average voltage of the cathode active material which has an average voltage less than 2.0 V (vs. Li) is calculated. The average voltage of the cathode active material which has an average voltage more than 2.9 V (vs. Li) can also be calculated in the same manner.

Hereinafter, the lithium air battery of the present invention will be explained by each constitution.

1. Cathode Layer

First, a cathode layer of the present invention will be explained. The cathode layer of the present invention comprises a first cathode layer having at least oxygen reduction ability and a second cathode layer having at least Li ion storage ability.

(1) First Cathode Layer

The first cathode layer of the present invention is a layer having at least oxygen reduction ability, and normally is a layer which functions as a cathode layer of a lithium air battery. Further, when the lithium air battery of the present invention is a secondary battery, the first cathode layer normally has Li oxide decomposition ability to decompose Li oxides ($LiO_2$, $Li_2O_2$) generated by the discharge reaction.

The first cathode layer of the present invention contains at least a conductive material and may further contain at least one of a binder and a catalyst. As an example of the conductive material, a carbon material is cited. Further, as specific examples of the carbon material, mention can be made of carbon black, Ketjen Black, Acetylene Black, furnace black, activated carbon, carbon nanotube, carbon fibers, and mesoporous carbon. Moreover, the conductive material preferably has a large specific surface area such as a specific surface area of 600 $m^2$/g or more. As an amount of the conductive material contained in the first cathode layer, it is preferably to be within the range of, for example, 10% by weight to 99% by weight. When the amount of conductive material contained is too small, the reaction filed is reduced and the battery capacity may be reduced. When the amount of conductive material contained is too large, the amount of the catalyst or binder reduces relatively and the desired first cathode layer may not be obtained.

Further, the first cathode layer of the present invention may contain a catalyst which promotes the reaction. Thereby, the electrode reaction is completed more smoothly. In particular, the conductive material preferably has a supported catalyst. As examples of the catalyst, manganese dioxide and cobalt phthalocyanine are cited. An amount of catalyst contained in the first cathode layer is preferably, for example, within the range of 1% by weight to 90% by weight. When the amount of catalyst contained is too small, a sufficient catalyst function may not be exhibited. When the amount of the catalyst contained is too large, the amount of the conductive material contained may be reduced relatively, the reaction filed is reduced, and thereby the battery capacity may be reduced.

Further, the first cathode layer of the present invention may contain a binder to immobilize the conductive material. As examples of the binder, mention can be made of fluorine-contained binders such as polyvinylidene fluoride (PVDF), polytetrafluoroethylene (PTFE), polyvinylidene fluoride-hexafluoropropylene (PVDF-HFP). An amount of the binder contained in the first cathode layer is, for example, preferably 40% by weight or less, and more preferably within the range of 1% by weight to 10% by weight.

A thickness of the first cathode layer varies depending on factors such as an application of the lithium air battery. For example, the thickness is preferably within the range of 2 μm to 500 μm, and particularly within the range of 5 μm to 300 μm.

(2) Second Cathode Layer

Next, the second cathode layer of the present invention will be explained. The second cathode layer of the present invention is a layer which has at least Li ion storage ability and normally is a layer which functions as a cathode layer of a lithium ion battery. Further, when the lithium air battery of the present invention is a secondary battery, the second cathode layer normally has Li ion release ability.

The second cathode layer of the present invention comprises at least the cathode active material and may further comprise at least one of a binder and a conductive material.

The average voltage of cathode active material is in the range less than 2.0 V (vs. Li) as explained above. In particular, the average voltage of cathode active material is preferably 1.8 V (vs. Li) or less, and more preferably within the range of 0.5 V (vs. Li) to 1.6 V (vs. Li). Thereby, the generation of unnecessary Li oxides is further restrained by clearly separating the operating voltage ranges. As examples of such cathode active material, mention can be made of layer/spinel material such as graphite and $Li_4Ti_5O_{12}$, and conversion material such as CoO, SnS, and $Fe_3P$.

On the other hand, the average voltage of cathode active material is in the range more than 2.9 V (vs. Li) as explained above. In particular, the average voltage of cathode active material is preferably 3.1 V (vs. Li) or more, and more preferably within the range of 3.3 V (vs. Li) to 4.4 V (vs. Li). Thereby, the generation of unnecessary Li oxides is further restrained by clearly separating the operating voltage ranges. As examples of such cathode active material, mention can be made of a 4V class cathode material such as $LiCoO_2$, $LiFePO_4$, $FePO_4$, and $LiMn_2O_4$, and a 5V class cathode material such as $LiNi_{0.5}Mn_{1.5}O_4$ and $LiCoPO_4$.

Further, the second cathode layer of the present invention may contain a binder to immobilize the cathode active material. A type and amount contained in the binder are the same as those explained in the above section of "(1) First Cathode Layer". Moreover, the second cathode layer of the present invention may contain a conductive material because it can improve the conductive properties of the second cathode layer. As examples of the conductive material, mention can be made of carbon materials such as carbon black, Ketjen Black, Acetylene Black, and furnace black. An amount of the conductive material contained in the second cathode layer is appropriately set according to factors such as a type of the cathode active material.

A thickness of the second cathode layer varies depending on factors such as an application of the lithium air battery. For example, the thickness is preferably within the range of 2 μm to 500 μm, and more preferably within the range of 5 μm to 300 μm.

(3) Cathode Layer

The cathode layer of the present invention comprises the above-mentioned first cathode layer and the second cathode layer. In the present invention, a positional relation of the first cathode layer and the second cathode layer is not particularly limited and can be designed optionally. In the present invention, the first cathode layer and the second cathode layer may be provided by lamination, or provided in parallel on the same plane. In case the layers are provided by lamination, the first cathode layer and the second cathode layer are preferably laminated in order of the second cathode layer and the first cathode layer from the anode layer side (see FIG. 1). Thereby, intake of oxygen becomes easy. In case the layers are provided in parallel, the first cathode layer and the second cathode layer can be formed in an optional pattern.

Further, the lithium air battery of the present invention preferably contains a cathode current collector which collects currents of the cathode layer. As examples of the cathode current collector material, a metal material and a carbon material are cited. Among them, the carbon material is preferable because it is excellent in corrosion resistance. As such a carbon material, a carbon fiber is preferable for example, because it is possible to conduct electrons through the fiber so that a carbon fiber has high electron conductivity. As examples of the cathode current collector using a carbon fiber, a carbon cloth and a carbon paper are cited. On the other hand, as examples of a metal material, stainless, nickel, aluminum, iron, and titanium are cited. As an example of a cathode current collector using a metal material, material such as a metal mesh is cited.

A technical structure of the cathode current collector for the present invention is not particularly limited as long as it can secure the desired electron conductivity. The structure may be a porous structure having gas diffuseness or may be a dense structure having no gas diffuseness. In particular, it is preferable in the present invention that the cathode current collector is a porous structure having gas diffuseness. Thereby, diffusion of oxygen is promptly attained. A porosity of the porous structure is not particularly limited. For example, the porosity is preferably within the range of 20% to 99%. Further, a thickness of the cathode current collector is for example, preferably within the range of 10 μm to 1000 μm, and more preferably within the range of 20 μm to 400 μm.

Further, in the present invention, a member made of the cathode layer and the cathode current collector is referred as "cathode". A forming method of a cathode for the present invention is not particularly limited as long as it is a method which can provide the above-mentioned cathode layer. As an example of the forming method of a cathode, a method of forming a first cathode layer forming composition and a second cathode layer forming composition respectively, successively coating these compositions to the cathode current collector, and drying the resultant is cited. The first cathode layer forming composition contains, for example, a solvent in addition to the above-mentioned conductive material, binder, and catalyst. On the other hand, the second cathode layer forming composition contains, for example, a solvent in addition to the above-mentioned cathode active material, binder, and conductive material. A solvent added to these compositions preferably has a boiling point of 200° C. or less. Thereby, drying becomes easy. As examples of the solvent, mention can be made of acetone, N-methyl-pyrrolidone (NMP), N,N-dimethylacetamide (DMA), N,N-dimethylformamide (DMF), methyl ethyl ketone (MEK), and tetrahydrofuran (THF).

As another example of a forming method of a cathode, a method utilizing differences in sizes of the conductive material, the cathode active material, and an opening part of the cathode current collector is cited. In this method, a size of one of the conductive material or cathode active material is made bigger than a size of an opening part of the cathode current collector and a size of the other of the conductive material or cathode active material is made smaller than the opening part of the cathode current collector, and thereby the first cathode layer and the second cathode layer are formed by one-time coating. In this case, it is possible to use a cathode layer forming composition which contains both of the conductive material and the cathode active material. In terms of the catalyst and the conductive material, it is also possible to have them contained in the target layer by similarly adjusting the size of the catalyst and the conductive material.

2. Anode Layer

Next, an anode layer of the present invention will be explained. The anode layer of the present invention generally contains an anode active material. The anode active material is not particularly limited as long as the material can release Li ions. In particular, the anode active material is preferably a material which can store/release Li ions because they can be used for a lithium air secondary battery.

As examples of the anode active material, a lithium metal, a lithium alloy, a lithium oxide, and a lithium nitride are cited. Further, as a lithium alloy, mention can be made of a lithium aluminum alloy, a lithium tin alloy, a lithium lead alloy, and a lithium silicon alloy. As a lithium oxide, lithium titanium oxide is cited. As a lithium nitride, mention can be made of lithium cobalt nitride, lithium iron nitride, and lithium manganese nitride.

Further, the anode layer of the present invention may contain only the anode active material or may contain at least one of a conductive material and a binder in addition to the anode active material. For example, when the anode active material is in a foil form, the anode layer can be made to a layer containing only the anode active material. When the anode active material is in a powder form, the anode layer can be made into a layer containing the conductive material and the binder. The conductive material and the binder are the same as those explained the above section "1. Cathode Layer", and thus an explanation here is omitted. Further, a thickness of the anode layer is preferably selected in accordance with a structure of the targeted lithium air battery.

Further, the lithium air battery of the present invention preferably has an anode current collector which collects currents of the anode layer. A material of the anode current collector is not particularly limited as long as it has conductivity. For example, copper, stainless, and nickel are cited. As a form of the anode current collector, forms such as foil, plate, and mesh (grid) are cited for example. Moreover, in the present invention, a battery case to be explained later may also have a function of the anode current collector. A thickness of the anode current collector is appropriately selected in accordance with a structure of the targeted lithium air battery.

In the present invention, a member made of the anode layer and the anode current collector is referred as "anode". A forming method of the anode in the present invention is not particularly limited as long as the method can provide the above-mentioned anode. As one example of a forming method of an anode, a method of providing an anode active material in a foil form on the anode current collector and applying a voltage to the resultant can be cited. As another example of a forming method of an anode, a method of preparing an anode layer forming composition containing an anode active material and a binder, coating the composition to an anode current collector, and drying the resultant can be cited.

3. Electrolyte Layer

Next, an electrolyte layer of the present invention will be explained. The electrolyte layer of the present invention is a layer formed between the cathode layer and the anode layer and conducts Li ions. A configuration of the electrolyte layer is not particularly limited as long as the layer has Li ion conductivity. For example, a nonaqueous liquid electrolyte, a nonaqueous gel electrolyte, a polymer electrolyte, and an inorganic solid electrolyte can be cited.

The nonaqueous liquid electrolyte normally contains a lithium salt and an organic solvent (nonaqueous solvent). As examples of the lithium salt, mention can be made of organic lithium salt such as $LiPF_6$, $LiBF_4$, $LiClO_4$, and $LiAsF_6$; and organic lithium salt such as $LiCF_3SO_3$, $LiN(CF_3SO_s)_2$, $LiN(C_2F_5SO_2)_2$, $LiC(CF_3SO_2)_3$. As examples of the organic solvent, mention can be made of ethylene carbonate (EC), propylene carbonate (PC), dimethyl carbonate (DMC), diethyl carbonate (DEC), ethyl methyl carbonate (EMC), butylene carbonate, γ-butyrolactone, sulfolane, acetonitrile, 1,2-dimethoxymethane, 1,3-dimethoxypropane, diethyl ether, tetrahydrofuran, 2-methyl tetrahydrofuran, and mixture thereof. Further, the organic solvent is preferably a solvent having high oxygen solubility because it can effectively use the dissolved oxygen for a reaction. A density of the lithium salt in the nonaqueous liquid electrolyte is, for example, within the range of 0.5 mol/L to 3 mol/L. In the present invention, a low-volatile liquid such as ionic liquid may be used as the nonaqueous liquid electrolyte.

The nonaqueous gel electrolyte is normally an electrolyte obtained by adding a polymer to a nonaqueous liquid electrolyte and turning the resultant into a gel. The nonaqueous gel electrolyte is obtained by adding a polymer such as polyethylene oxide (PEO), polyacrylnitrile (PAN), or polymethylmethacrylate (PMMA) to the above-mentioned nonaqueous liquid electrolyte and turning the resultant into a gel. In the present invention, a nonaqueous gel electrolyte of LiTFSI (LiN(CF$_3$SO$_2$)$_2$)—PEO series is preferable. Further, as an example of the inorganic solid electrolyte, an inorganic solid electrolyte of Li—La—Ti—O series is cited. In the present invention, the inorganic solid electrolyte can be formed into a solid electrolyte film and provided between the cathode layer and the anode layer.

The lithium air battery of the present invention preferably has a separator between the cathode layer and the anode layer because a highly-safe battery can be obtained. As examples of the separator, a porous film such as polyethylene and polypropylene, and a nonwoven fabric such as resin nonwoven fabric and glass nonwoven fabric are cited.

4. Battery Case

Next, a battery case of the present invention will be explained. A shape of the battery case of the present invention is not particularly limited as long as it can store the above-mentioned cathode layer, anode, and electrolyte. As specific examples, a coin type, a flat plate type, a cylinder type, and a laminate type are cited. Further, the battery case may be an open air type battery case or a hermetically-sealed type battery case. The open air type battery case is a battery case which can contact to the air as shown in FIG. 1. When a battery case is the hermetically-sealed type battery case, it is preferable to provide an inlet tube and an outlet tube for gas (air) to the hermetically-sealed type battery case. In this case, the gas being inlet/outlet preferably has high level of oxygen concentration and pure oxygen is more preferable. Further, it is preferable to higher the level of oxygen concentration at the time of discharge and lower the level of oxygen concentration at the time of charge.

5. Lithium Air Battery

A lithium air battery of the present invention may be a primary battery or a secondary battery. In particular, the lithium air battery of the present invention is preferably a secondary battery because it can be applied for various applications. As examples of applications of the lithium air battery for the present invention, in-car application, stationary-type light source application, and household use-type light source application are cited. Further, a method of forming a lithium air battery of the present invention is not particularly limited and it is similar to a general method of forming a metal air battery. Moreover, the present invention provides a method to use the above-mentioned lithium air battery, in which different battery properties for the lithium air battery and the lithium ion battery can be used by adjusting the current load.

The present invention is not limited to the embodiments. The embodiments are illustrations and any variations and modifications which have the substantially same structure as the technical idea described in claims of the present invention and achieve the same operation effect are encompassed in the technical scope of the present invention.

EXAMPLES

Hereinafter, the present invention is further specifically explained by way of examples.

Example 1

Production of Cathode

Carbon black (size of the primary particle was 100 nm or less, and size of the secondary particle aggregate was about some μm), graphite (median diameter 11.5 μm), and PVDF-HFP were weighed so as to make the weight ratio 25:42:33 and mixed. Next, the mixture and acetone were mixed and stirred (2000 rpm, 30 minutes) and a cathode layer forming composition was obtained. The average voltage of graphite calculated by the above-mentioned method was about 0.2 V (vs. Li).

Next, a carbon paper having an opening size of 8 μm (manufactured by Toray Industries, Inc., TGP-H-090®, thickness 0.28 mm) was prepared as a cathode current collector. The above-obtained cathode layer forming composition was coated by a doctor blade to this carbon paper. Then, the resultant was dried in Ar atmosphere at 80° C. for 1 hour, and was vacuum dried at 60° C. for a whole day and night. Thereby, a cathode having the cathode current collector, first cathode layer (the layer containing the carbon black), and second cathode layer (the layer containing the graphite) provided in this order was obtained.

(Production of Cell for Evaluation)

First, using the above-obtained cathode, a lithium air battery device was produced. Assemble of the device was carried out in an argon box. For a battery case of the device, an F-type electrochemical cell manufactured by Hokuto Denko Corporation was used.

A metal Li (manufactured by Honjo Metal Co., Ltd., φ 18 mm, thickness 0.25 mm) was provided in the battery case. Then, a separator (φ 18 mm, thickness 25 μm) made of polyethylene was provided on the metal Li. A nonaqueous liquid electrolyte, obtained by dissolving LiClO$_4$ (manufactured by Kishida Chemical Co., Ltd.) in propylene carbonate (PC, manufactured by Kishida Chemical Co., Ltd.) by the density of 1M, was injected onto the separator for 4.8 ml. Next, the cathode layer of the cathode was provided in such a manner to face the separator and the battery case was sealed to obtain a lithium air battery device. Then, thus obtained device was placed in a desiccator filled with oxygen (oxygen concentration level 99.99 volume %, inner pressure 1 atm, desiccator capacity 1 L) and a cell for evaluation was thereby obtained.

Comparative Example 1

A cell for evaluation was obtained in the same manner as in Example 1 except that MnO$_2$ (d$_{50}$=15 μm) was used instead of graphite. The average voltage of MnO$_2$ calculated by the above-mentioned method was about 2.7 V (vs. Li).

[Evaluation]

(1) Discharge Test

Figure 4:
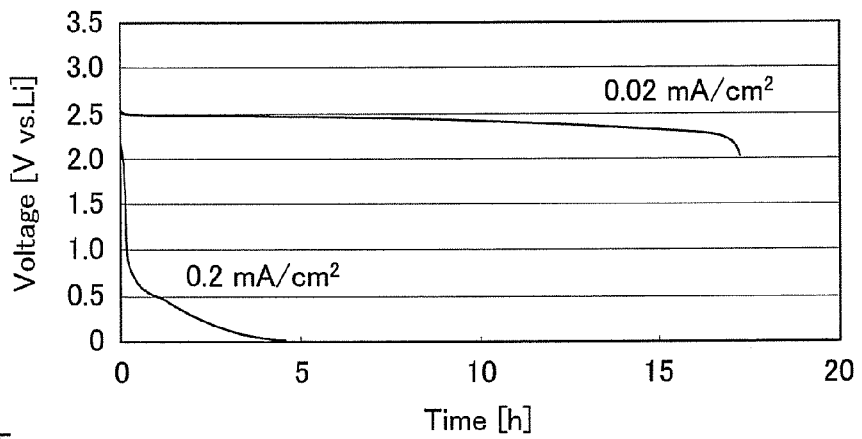
FIG. 4 is a graph illustrating the results of the discharge test.

Using the cell for evaluation obtained in Example 1, a discharge test was conducted. The discharge was carried out under the conditions of large-current discharge (current density 0.2 mA/cm$^2$, current under 0.01 V (vs. Li) was cut) and low-current discharge (current density 0.02 mA/cm$^2$, current under 2.0 V (vs. Li) was cut). The results are shown in FIG. 4. As shown in FIG. 4, it was confirmed that the cell for evaluation obtained in Example 1 functioned as a lithium ion battery at the time of large-current discharge and functioned as a lithium air battery at the time of low-current discharge. Thereby, it was confirmed that the cell can use different battery properties according to the current density at the time of discharge.

(2) Impedance Estimate

Figure 5:
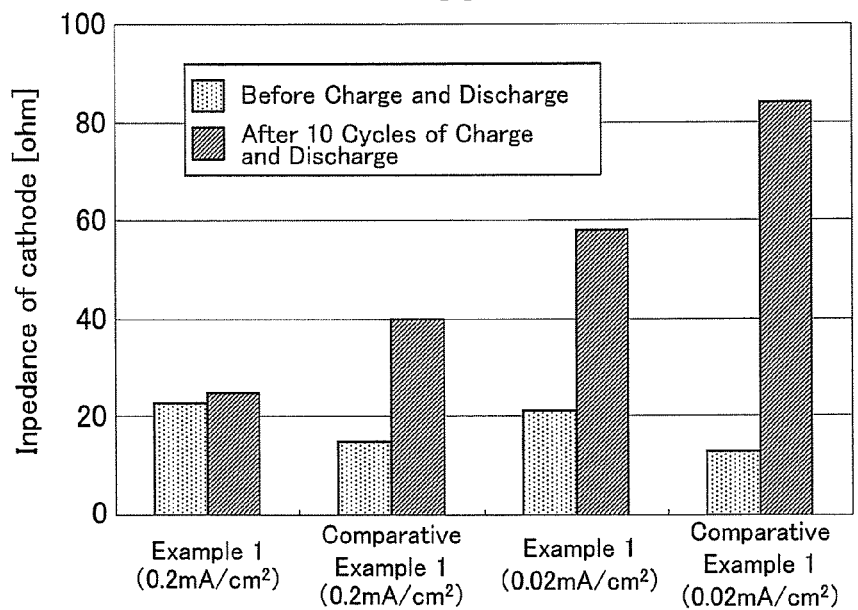
FIG. 5 is a graph illustrating the result of the impedance estimate.

Using the cells for evaluation obtained in Example 1 and Comparative Example 1, changes in impedance of the cathode layer caused by charge and discharge were evaluated. The charges and discharges were carried out under the conditions of large-current charge and discharge (current density 0.2 mA/cm$^2$, 0.01 V to 1.5 V (vs. Li)) and low-current charge and discharge (current density 0.02 mA/cm², 2.0 V to 4.3 V (vs. Li)). The results are shown in FIG. 5. As shown in FIG. 5, it was confirmed that the cell for evaluation obtained in Example 1 had restrained increase in impedance at the time of large-current charge and discharge (0.2 mA/cm²) compare to the impedance of the evaluation cell of Comparative Example 1. This is thought because the evaluation cell of Example 1 functioned as a lithium ion battery at the time of large-current discharge, and thereby restrained the generation of Li oxide generated from the discharge reaction of the lithium air battery. On the other hand, at the time of low-current charge and discharge (0.2 mA/cm²), there was no big difference observed in the increase in impedance between the evaluation cells of Example 1 and Comparative Example 1. This is thought because both cells functioned as lithium air batteries at the time of low-current charge and discharge.

The invention claimed is:

1. A dual-type battery configured to function as a high-capacity lithium air battery at a time of low-current discharge and a high-power lithium ion battery at the time of large-current discharge, the dual-type battery comprising a cathode layer, an anode layer, and an electrolyte layer formed between the cathode layer and the anode layer, wherein the cathode layer further comprises a first cathode layer having at least oxygen reduction ability and a second cathode layer having at least Li ion storage ability, wherein an operating voltage range of the first cathode layer having at least oxygen reduction ability is completely separated from an operating voltage range of the second cathode layer having at least Li ion storage ability, the second cathode layer contains a cathode active material having an average voltage of less than 2.0 V (vs. Li) or an average voltage of more than 2.9 V (vs. Li), and the first cathode layer and the second cathode layer are laminated and provided in order of the second cathode layer and the first cathode layer from the anode layer side.

2. The dual-type battery according to claim 1, wherein the cathode active material is graphite or $Li_4Ti_5O_{12}$.

3. The dual-type battery according to claim 1, wherein the cathode active material is $LiCoO_2$ or $LiFePO_4$.

* * * * *

UNITED STATES PATENT AND TRADEMARK OFFICE
CERTIFICATE OF CORRECTION

PATENT NO.       : 8,741,492 B2
APPLICATION NO.  : 12/999460
DATED            : June 3, 2014
INVENTOR(S)      : Fuminori Mizuno et al.

It is certified that error appears in the above-identified patent and that said Letters Patent is hereby corrected as shown below:

In the Specification

Column 8, line 51, please change "$LiN(CF_3SO_s)_2$" to --$LiN(CF_3SO_2)_2$--

Signed and Sealed this
Tenth Day of March, 2015

Michelle K. Lee
*Deputy Director of the United States Patent and Trademark Office*